April 8, 1941.   T. M. WEST   2,237,322
CLUTCH MECHANISM
Filed June 1, 1939   2 Sheets-Sheet 1

Inventor
*T. M. West*

By *Clarence A. O'Brien
and Hyman Berman*
Attorneys

April 8, 1941.  T. M. WEST  2,237,322
CLUTCH MECHANISM
Filed June 1, 1939   2 Sheets-Sheet 2

Inventor
T. M. West
By Clarence A. O'Brien
and Hyman Berman
Attorneys

Patented Apr. 8, 1941

2,237,322

UNITED STATES PATENT OFFICE 2,237,322

CLUTCH MECHANISM

Thomas M. West, Dorchester, Nebr.

Application June 1, 1939, Serial No. 276,880

3 Claims. (Cl. 192—48)

This invention relates to a clutch mechanism for tractors or motor vehicles, and has for the primary object the provision of a device of this character which may be readily adapted to an engine of a tractor or motor vehicle to replace the usual clutch thereof and which will permit clutching and declutching of the engine to the tractor wheels of the tractor or motor vehicle as usual and also will permit a power takeoff means to be clutched and declutched to the engine regardless of the action of the clutch so that power may be delivered constantly to the power takeoff means for driving various devices regardless of the tractor or motor vehicle being in motion or standing idle or when declutching the traction wheels of the tractor or motor vehicle from the engine for shifting speed gears of the transmission or for bringing the tractor or motor vehicle to a stop.

Another object of this invention is the provision of means for connecting and disconnecting the clutches as desired, whereby the clutches may be made to act together or simultaneously in delivering power or separately of each other.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a vertical sectional view illustrating a clutch mechanism constructed in accordance with my invention.

Figure 1:
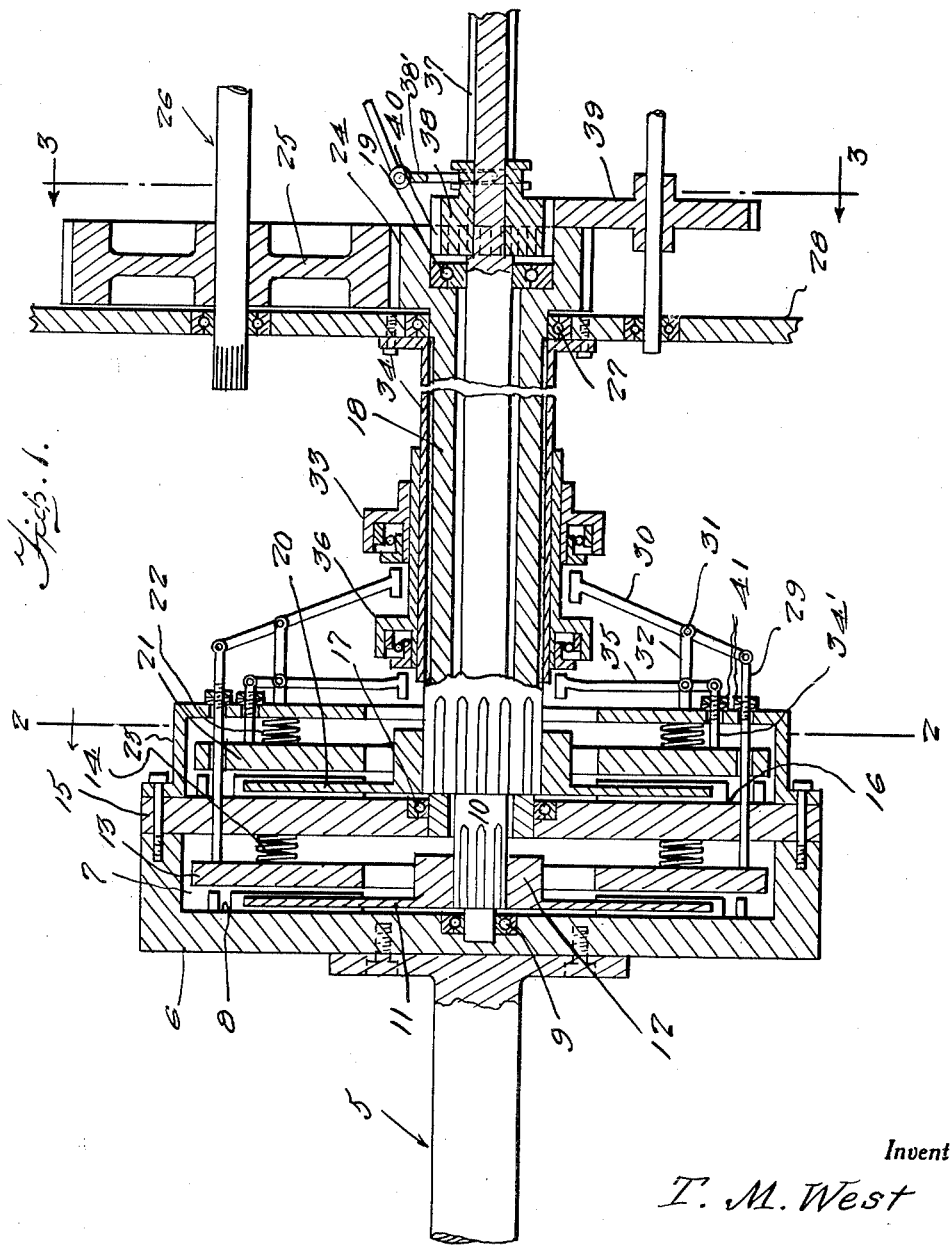
Figure 2:
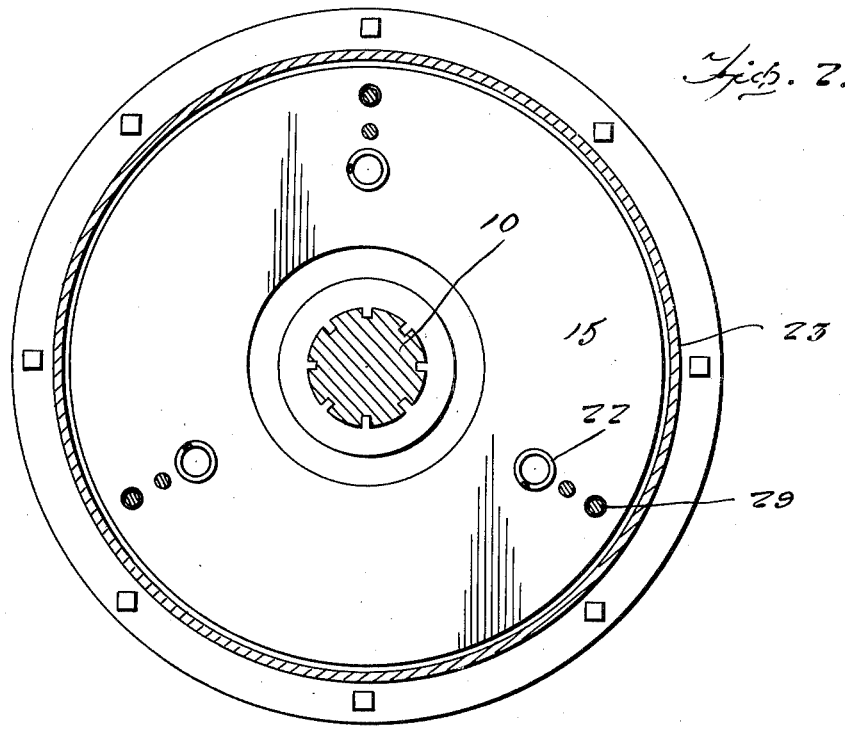
Figure 2 is a transverse sectional view taken on the line 2—2 of Figure 1.
Figure 3:
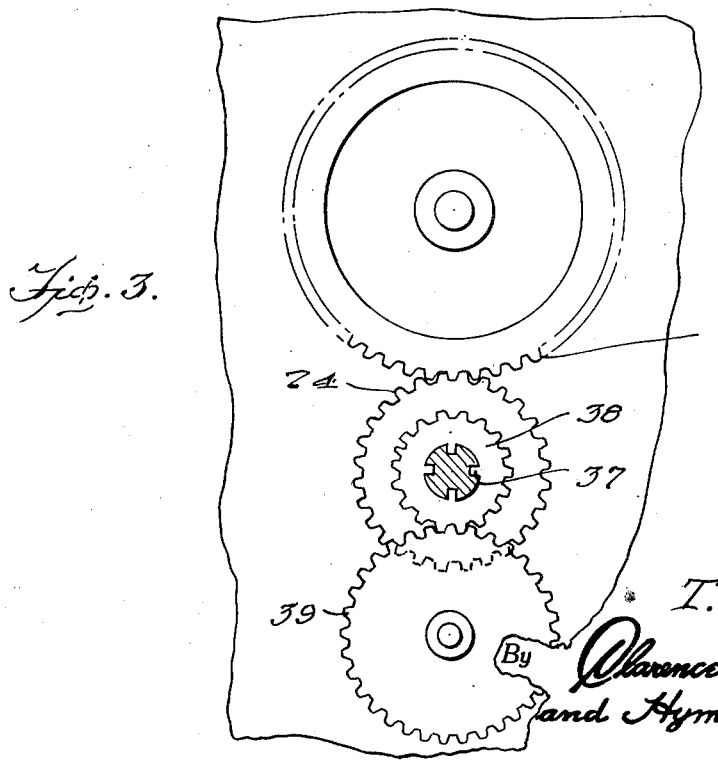
Figure 3 is a transverse sectional view taken on the line 3—3 of Figure 1.

Referring in detail to the drawings, the numeral 5 indicates a fragmentary portion of a crank shaft of an engine to which is connected a fly wheel 6 having a chamber 7 for the accommodation of a clutch mechanism and one face of the fly wheel providing a clutch element or member designated by the character 8. It is to be understood that the crank shaft 5 and fly wheel 6 form a part of an engine of the internal combustion type employed for the propulsion of a tractor or motor vehicle.

The fly wheel 6 is provided with a pilot bearing 9 for supporting the forward end of a shaft 10 in alignment with the crank shaft 5. It is to be understood that the shaft 10 is free to rotate relative to the fly wheel 6. Splined on the shaft 10 for coaction with the clutch face or member 8 of the fly wheel to establish driving connection between the fly wheel and the shaft 10 is a clutch plate 11.

The clutch plate 11 is equipped with the usual hub portion 12 and surrounding and spaced therefrom is a clutch pressure plate 13 acted on by expansion springs 14 of the coil type for the purpose of urging the clutch plate 11 in engagement with the face 8 of the fly wheel for the purpose of establishing the driving connection between the fly wheel and the shaft 10. The springs 14 seat against an auxiliary plate 15 bolted to the fly wheel and acting to close the chamber 7 and also forming a clutch face designated by the character 16. The plate 15 carries a pilot bearing 17 for rotatably supporting the forward end of a hollow shaft 18 which surrounds the major portion of the shaft 10 and is spaced therefrom. The hollow shaft 18 also is equipped with a bearing 19 for rotatably supporting the shaft 10. The shaft 18 has splined thereon a clutch plate 20 similarly constructed to the clutch plate 11 and coacting with the clutch plate 20 is a clutch pressure plate 21 acted on by a coil spring 22 having seated engagement with a casing 23 bolted on the plate 15 carried by the fly wheel 6.

The shaft 10 is adapted to be connected to the usual transmission of the tractor or motor vehicle in the conventional manner while the rear end portion of the hollow shaft 18 is enlarged and provided on the exterior thereof with teeth to form a gear 24 meshing with a gear 25 forming a part of a power takeoff 26. The shaft 18 is supported by a bearing 27 carried by a supporting member 28 of any desired construction and which also forms a support for the power takeoff device 26.

Pressure plate operating rods 29 are secured to the pressure plate 13 and extend through the plate 15, pressure plate 21 and casing 23 and are pivotally connected to clutch operating arms 30 pivotally mounted, as shown at 31, on brackets 32 carried by the casing 23. The clutch operating arms coact with a clutch throw-out bearing 33 of a conventional construction slidably mounted on a sleeve bearing forming part of a throw-out bearing 36 slidably mounted on a sleeve 34 surrounding the hollow shaft 18 and carried by the supporting member 28. It is to be understood that the throw-out bearing 33 may be operated in a conventional manner to bring about clutching and declutching of the shaft 10 with the fly wheel 6.

Pressure plate rods 34' are secured to the pressure plate 21 and extend through the casing 23 and are pivotally connected to clutch operating arms 35 pivotally mounted on the brackets 32 and which coact with the throw-out bearing 36 mounted for sliding movement on the sleeve 34. The clutch throw-out bearing 36 is operated in the conventional manner for the purpose of clutching and declutching the shaft 18 to the fly wheel.

The shaft 10 adjacent the bearing 19 is provided with splined ribs 37 on which is splined a comparatively broad gear 38 always in continuous mesh with a gear 39 forming a part of a conventional power takeoff of the transmission, not shown. The gear 38 may be shifted on the shaft 10 in any well known manner such as indicated at 38' in Figure 1 and when in one position may be brought into engagement with internal teeth 40 formed in the hollow shaft 18 and when in this position establishes driving connection between the clutch units which have been described so that both act on the transmission of the vehicle and also on the power takeoff mechanisms heretofore referred to.

The pressure plate operating rods 29 and 34 are screw threaded to receive nuts 41 which may be turned against the casing 23 whenever it is desired to render either or both of the clutch units inoperative, that is, in declutched relation to the fly wheel.

From the foregoing description it will be seen by referring to Figure 1 of the drawings that the present invention constitutes a pair of clutch units readily adaptable to a fly wheel of the crank shaft of an engine for the purpose of connecting the engine to the usual transmission of the vehicle as well as the conventional power takeoff and which will permit the clutching and declutching of a second power takeoff mechanism to the engine whereby a continuous flow of power may be had to the second power takeoff mechanism regardless of the vehicle being in motion or standing idle or in the act of changing the speed gears of the transmission of the vehicle. A device of this kind is extremely practical for use on tractors employed for operating threshing machines and similar devices wherein the devices are pulled by the tractor so that such devices may be kept in operation regardless of the fact that the tractor is traveling forward or rearwardly or standing idle or having the speed changing gears thereof changed.

It is believed that the foregoing description when taken in connection with the drawings will fully set forth the construction and advantages of this invention to those skilled in the art to which such a device relates, so that further detailed description will not be required.

Having described the invention, what I claim is:

1. In a device of the character set forth including a fly wheel of an engine, a transmission shaft piloted into the fly wheel, a clutch plate for coaction with the fly wheel and splined on said shaft, a pressure plate coacting with the clutch plate, a plate secured on the fly wheel having an opening to permit the shaft to extend therethrough, spring means between the second plate and the pressure plate, a hollow shaft journaled on the first shaft and piloted into the second plate, a second clutch plate splined to the hollow shaft for coaction with the second-named plate, a second pressure plate for the second clutch plate, and operating means for the pressure plates.

2. In a device of the character set forth including a fly wheel of an engine, a transmission shaft piloted into the fly wheel, a clutch plate for coaction with the fly wheel and splined on said shaft, a pressure plate coacting with the clutch plate, a plate secured on the fly wheel having an opening to permit the shaft to extend therethrough, spring means between the second plate and the pressure plate, a hollow shaft journaled on the first shaft and piloted into the second plate, a second clutch plate splined to the hollow shaft for coaction with the second-named plate, a second pressure plate for the second clutch plate, operating means for the pressure plates, means for connecting the hollow shaft to a power takeoff, and a clutch means between said shafts.

3. In combination with a fly wheel of an engine and a clutch unit coacting with the fly wheel and including a transmission shaft and a power takeoff, a clutch plate secured to said fly wheel, a second clutch unit to engage and disengage with the clutch plate, means for operating the second clutch unit, a hollow shaft connected to said second clutch unit and journaled on said transmission shaft, a second power takeoff driven by said hollow shaft, and a shiftable gear means providing a permanent drive between the first-mentioned power takeoff and the transmission shaft and for connecting and disconnecting the transmission shaft with the hollow shaft.

THOMAS M. WEST.